Patented June 2, 1936

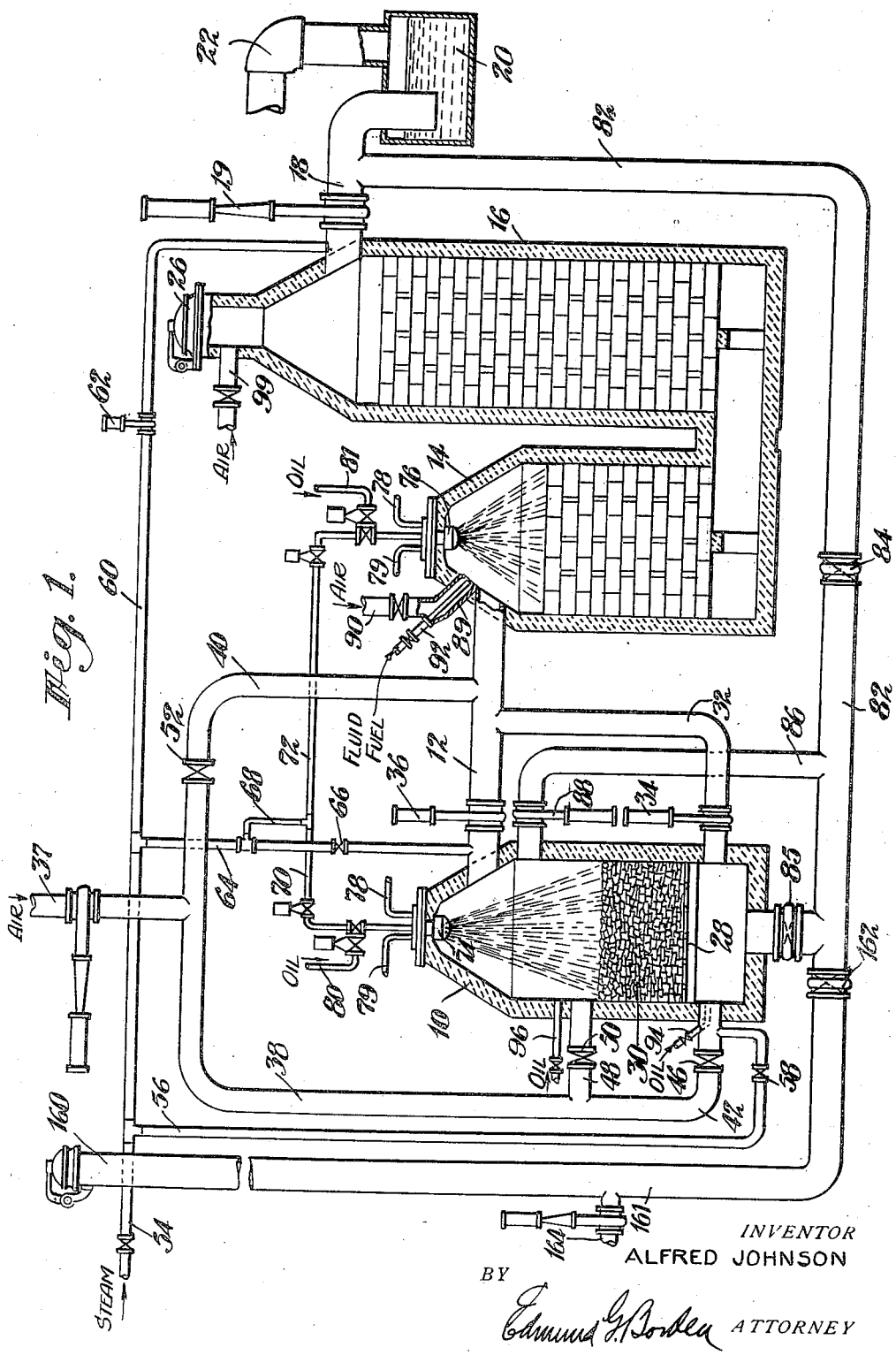

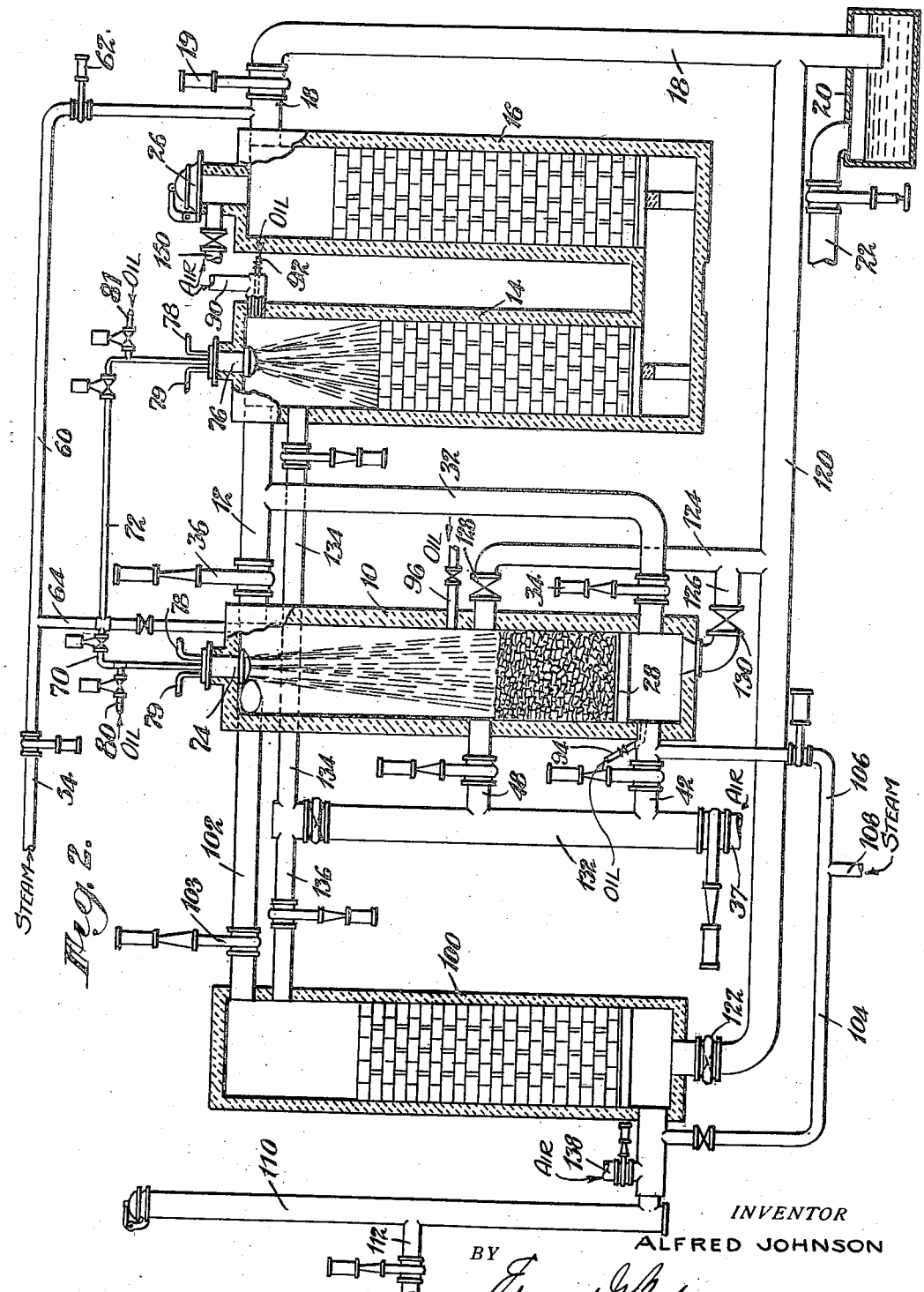

2,042,999

UNITED STATES PATENT OFFICE 2,042,999

OIL GASIFICATION PROCESS

Alfred Johnson, West New Brighton, N. Y., assignor to Combustion Utilities Corporation, New York, N. Y., a corporation of Maine Application August 24, 1932, Serial No. 630,176
In Canada August 16, 1932

2 Claims. (Cl. 48—214)

This invention relates to oil gasification, and more particularly it concerns a process and apparatus for the uniform production from hydrocarbon oils and gases of a combustible gas of regulated heating value and specific gravity, adapted as a substitute for natural gas or manufactured gas for use for industrial and domestic purposes. The invention has special utility in connection with a process and apparatus of the type described in my co-pending patent application, Serial No. 561,354, filed September 5th, 1931 for "Oil gasification process and apparatus", involving the spraying of oil upon a highly heated refractory generator screen after the latter has been heated uniformly to gas-making temperature by consecutive up-and-down air blasting in successive stages of a heating cycle,—the heat for the oil gasification being supplied by combustion alone of the carbon deposited within the generator screen during a previous gas-making cycle. The invention however is not limited to such application, but is also of distinct value in various oil gasification processes involving the enrichment of a primary combustible gas within a carbureter element.

For purposes of illustration only, the invention is here described in connection with an oil gasification process, utilizing a refractory screen type of generator, in view of its special application to this type of operation.

In processes of the type set out in my above-mentioned co-pending application, preferably the air flow rates during the air blasting or heating cycle are sufficiently high to produce a substantial amount of turbulence in the blast gases, and to effect an intimate mixture thereof with the secondary air introduced therewith into the upper part of the generator and/or carbureter. This mixing is greatly facilitated by a tangential arrangement of the blast gas inlet line to the carbureter. Under such conditions all of the blast gases are very rapidly and completely burned within the top of the carbureter or prior thereto,—together with carbon which may be mechanically carried over with the blast gases from the refractory generator screen.

In the case of some installations, however, particularly where previously-constructed standard water gas sets have been modified for the practice of the invention described in the afore-mentioned Johnson application,—the arrangement and construction of the generator and carbureter with their connections is such that under normal conditions of operation there is an insufficient or improper mixing of the blast gases with the secondary air entering the carbureter, due to such factors as unsuitably low velocity flow of the blast gases to the carbureter, and the lack of suitable equipment for properly mixing the gas and secondary air in the top of the carbureter.

In certain instances it sometimes happens that the top of the carbureter becomes so cooled during the spraying thereto of oil in the carbureting step of the gas-making cycle, particularly where a very large amount of carbureting fluid must be employed for enrichment purposes,—that the first portion of the blast gases flowing to the carbureter upon the succeeding heating cycle, is not immediately ignited in the carbureter top. Such ignition may then occur explosively further along in the carbureter or superheater,—and of course is highly objectionable for obvious reasons.

These various undesirable conditions may interfere to some extent with the uniform efficient operation of the gas-making set.

The present invention is based upon the discovery that the difficulty in such cases in obtaining sufficient heat for all carburetion purposes in the production of a relatively high heating value gas, such as a 750 to 1200 B. t. u. gas, is due to the difficulty sometimes encountered in certain carbureted water-gas sets in properly burning the primary blast gases and free carbon with secondary air in the upper part of the carbureter during the heating or blast cycle. Ample carbon in all cases is provided within the refractory generator screen in the afore-mentioned Johnson oil gasification process for supplying all the heat requirements for preparing the set for a subsequent gas-making cycle. Applicant has further discovered that in instances where the design of the gas-making set is such as to prevent therein sufficiently high gas velocities, and where the lack of other conditions producing turbulence and intimate intermixture of blast gases and secondary air in the carbureter top prevents sufficiently rapid and complete combustion therein,—the set can still function effectively for oil gasification employing a refractory screen generator and successive up-and-down blast stages in a heating cycle by providing for the burning during either or both stages of the blast cycle of very small amounts of hydrocarbon oil or gas in the top of the carbureter or alternatively, in the top of the generator. By burning as small an amount as from .1 to .8 gallon of gas oil or fuel oil in the top of the carbureter during the blast cycle per 1000 cubic feet of gas made, a wide variety of types of standard carbureted water gas sets may be readily adapted for producing gas varying in heat value from below 500 to 1500 B. t. u. per cu. ft. in accordance with the invention set out in my aforesaid application. The volume of oil burned in this manner for supplemental heating purposes will vary primarily with the amount of carbureting oil required to bring the heating value of the gas up to the desired amount, but also somewhat in accordance with the specific design of generator, carbureter and connections, and the rates of gas flow possible through the various units of the set. Within reasonable limits, the larger the combustion space provided in the top of the carbureter and the more intimately the blast gas and secondary air are mixed, the smaller the amount of oil required to be burned during the blast cycle in the top of the generator or carbureter for supplemental heating purposes.

In the accompanying drawings illustrating certain preferred apparatus forming part of the invention, Fig. 1 shows in vertical section a somewhat modified standard water gas set; and Fig. 2 shows in vertical section a four-unit gas-making set embodying the invention.

Referring to Fig. 1, numeral 10 designates a gas generator connected through conduit 12 with a carbureter 14. The latter is connected at its base with a superheater 16, from which a conduit 18 controlled by valve 19, leads to a wash box 20,—with the latter of which the usual gas offtake line 22 communicates and leads to gas scrubbers and to storage. The superheater is provided with the stack valve 26.

The generator 10 has therein a grate 28 upon which is supported a gas permeable bed or screen 30 of considerable depth, composed of refractory bodies, which may if desired be impregnated or mixed with high-melting oxidation-resistant metals or alloys such as nickel or platinum. The depth of the screen will vary from around 2 feet upwardly, depending upon the nature and size of the refractory material, and upon such conditions of operation as the temperatures to be maintained in the screen and the rate of flow of gases therethrough. While the size and shape of the refractory bodies employed in the screen may vary somewhat, highly satisfactory results have been obtained employing a depth of from 2½ feet to 6 feet of refractory bodies each approximately 1½" x 1½" x 1¼" in size. The uppermost layers of refractory bodies forming the screen may be of somewhat smaller size than those in the lower portion of the screen; and the bodies may be oblong or round in form. Round refractory bodies are of particular advantage in the upper layers of the refractory screen because this shape gives a more uniform distribution of the open space between adjacent bodies and thereby forms a screen having more efficient filtering action.

Since temperatures as high as 2600° to 3000° F. sometimes are developed in the refractory screen, the material composing the refractory screen preferably is of highly heat-refractory material. High alumina refractories such as "Alusite" (which is a 60% aluminum oxide refractory having a low iron content and embodying a coarsely ground aggregate burned to a high temperature) are serviceable,—as are refractories made from carborundum, pure alundum, and high silica bricks, which are adapted to resist temperatures well above 3000° F. for long periods of time without injury.

The lower part of the generator 10 below the grate communicates with the conduit 12 through the line 32 controlled by valve 34. A valve 36 is disposed in the line 12 between the generator and line 32.

For introducing air for combustion into the generator and carbureter, a valve-controlled air header 37 is in communication with the generator below the grate through conduits 38 and 42 under control of valve 46—and with the generator above the refractory screen through conduits 38 and 48 controlled by valve 50. A branch line 40, controlled by valve 52 leads to conduit 12 at or adjacent the carbureter. For the purpose of supplying steam to the various elements of the gas-making set, there is provided a main steam header 54, having branch line 56 controlled by valve 58, communicating with the base of the generator; and steam line 60 controlled by valve 62 leading to the upper end of the superheater.

A branch steam line 64 controlled by valve 66 controls the flow of steam to the top of generator 10 as required. A steam line 68 connects the line 64 through the valve-controlled branch lines 70 and 72 with the oil spray nozzles 74, 76 in the generator and carbureter. Each spray nozzle is provided with a cooling jacket and with means including inlet and outlet water connections 78 and 79. Valve-controlled oil lines 80 and 81 communicate respectively with the spray nozzles 74 and 76. A rich gas offtake header 82 controlled by valve 84 establishes communication between the lower part of the generator below the grate and the wash box through valved connection 85. A branch rich gas offtake 86 controlled by valve 88 leads from the generator above the refractory screen therein to the header 82.

The base of the generator below the grate is in valve-controlled communication with a stack 160 through conduit 161 controlled by valve 162. A valve-controlled blast gas conduit 164 may connect the conduit 161 with a waste heat boiler for heat regeneration.

For the purpose of heating the various elements of the gas-making set including the refractory screen, when starting up, a valve-controlled oil conduit 94 leads to the generator below the grate,—and a valve-controlled oil conduit 96 leads to the generator above the top of the refractory screen therein. Furthermore a fluid fuel burner 89, which may include a valve-controlled fluid fuel supply line 92 and a valve-controlled air supply line 90 is disposed in the upper part of the carbureter. A valve-controlled air conduit 99 leads to the top of the superheater 16.

In the modification of the invention illustrated in Fig. 2, the respective generator and carbureter are of somewhat different design than in the corresponding units of Fig. 1. The features of construction shown in Fig. 2 are similar to those of Fig. 1, with certain exceptions indicated below:

In Fig. 2, the upper end of the generator 10 is in controlled communication with a regenerator 100 through a conduit 102 controlled by valve 103. Conduit 102 opens tangentially into the generator 10 in the manner shown. In this figure the main air line 37 is connected through a header 132 respectively with the conduit 42 leading to the base of the generator below the grate, and with the conduit 48 leading to the generator above the refractory screen therein. The header 132 is connected through the valve-controlled line 134 with the upper part of the carbureter; and through the valve-controlled conduit 136 with the upper part of the regenerator 100. Valve controlled branch steam lines 104, 106 lead respectively from a steam header 108 to the base of the regenerator 100, and to the base of the generator 10. The lower portion of the regenerator 100 is connected with stack 110. A rich gas offtake conduit 120, controlled by the valve 122, establishes controlled communication between the base of the regenerator 100 and the wash box. A valve-controlled air conduit 138 is connected with the lower part of the regenerator 100. Both the base and the upper part of the generator are respectively connected with the wash box by way of rich gas conduit 120 and interconnected conduits 124 and 126, controlled by the corresponding valves 128 and 130.

In the practice of the invention using the water gas set shown in Fig. 1,—a series of cycles including the following preferably is employed, although the respective up-blast and down-blast stages may be interchanged if desired. Assuming that the various elements of the set are at working temperature, and that an oil gas-making cycle has been completed and the refractory screen contains carbon deposited in and upon it, a small amount of a hydrocarbon fluid, oil or gas, and air, preferably premixed, is introduced in the top of the carbureter through conduits 92, 90 and burned therein,—the heat therein igniting the combustible mixture. The resultant combustion gases highly heat the carbureter top, and then flow through the carbureter and superheater.

The necessary valves are adjusted to cause a flow of air alone, or of air more or less saturated with steam into the generator through conduit 42. The air flows upwardly through the highly heated refractory screen and reacts with the carbon held therein. The resultant blast gases carrying more or less carbon in suspension then flow to the carbureter where they are promptly ignited by the burning oil therein and are burned with secondary air introduced at 40. The checker brick of the carbureter and superheater are thus readily brought to temperatures preferably in the range from 1350° to 1500° F. After the up-blast air stage is continued for sufficient time to burn the carbon from the lower part of the generator screen, the valve 46 is closed, and a short down-steam purge of the generator is effected by steam flowing from line 64, the purged gases flowing through line 32. Then valve 50 is opened to admit air to the generator above the refractory screen, and the remaining carbon therein is burned by air flowing downwardly therethrough; the blast gases flowing through conduit 32 to the carbureter where they are burned with secondary air. During this blasting stage the burning of oil in the carbureter top preferably is continued, although in many cases this is not essential.

The carbureter oil burning preferably is discontinued a short time in advance of the termination of the second air-blasting stage, and in any event before the succeeding gas-making cycle begins.

After the major portion at least of the carbon in the generator screen has been consumed, and the latter brought to suitable gas-making temperature, the flow of air is discontinued, and a short down-steam purge is effected by steam flowing from line 64; the resultant purged gases flowing through the carbureter and superheater to the wash box. A mixture of steam and hydrocarbon oil is then introduced into the generator through nozzle 74, supplemented if desired by steam flowing from line 64. The nozzle effects thorough oil distribution upon the top surface of the generator screen, and rapid decomposition of the oil occurs. The mixed hydrocarbon gases and water gas formed during passage of the oil vapors and steam through the refractory screen flow to the carbureter where they encounter a spray of hydrocarbon oil or other carburant; and the carbureted mixed gases flow through the carbureter and superheater to the wash box.

The oil introduced into the carbureter through nozzle 76 preferably is of a lighter gravity than that employed in the generator,—such as gas oil. It is preferred to use in the generator a heavier hydrocarbon oil such as one having an A. P. I. gravity of 12° to 18½°, or a hydrocarbon mixture containing the tar produced in the process which is well adapted for use in the present invention.

Following completion of the down-run cycle, an up-run with steam is employed, the latter being introduced through conduit 56, and the resultant mixed gases flowing through the carbureter and superheater either with or without enrichment, and thence to the wash box. The abovementioned series of cycles is then repeated.

The efficiency of the process is greatly improved where the primary air and/or secondary air employed is preheated to or near the ignition temperature of the carbon deposited in the generator screen. The heat required for preheating the air may effectively be that regenerated from the process. In such case the previously described procedure is then modified in the following manner:—The air, with or without admixture with steam, employed in the second or down-blast stage of the air blasting cycle enters the superheater through conduit 99 and thence flows to the generator, being heated during passage through the superheater and carbureter. The preheated air flows downward through the refractory generator screen and thence through the stack 160 to the atmosphere. During this stage of the heating cycle the carbureter oil burner 89 preferably is cut off. Additional cold or preheated air can be introduced through line 40 to the gases entering the generator during this stage.

In the preferred practice of the invention employing the construction shown in Fig. 2, the series of cycles are the same as those described above, with the exception of the up-blast cycle. In the latter, the blast gases flowing from the generator screen are divided and a selected portion thereof flows to the carbureter and superheater in the manner previously described. During this stage oil or hydrocarbon vapor or gas is burned with air in the top of the carbureter in regulated amounts for the purpose of bringing the carbureter top to the desired temperature for supporting enrichment of the gases produced in the succeeding gas-making cycle. A second regulated portion of the hot blast gases from the generator flow directly through the regenerator 100 to the stack 110. In instances where it is desired to increase the temperature of the blast gases leaving the generator a small amount of oil may be introduced into the generator through line 96 and burned therein with air introduced through line 48, the superheated gases then flowing to the respective regenerator and carbureter. The burner 96 may be used alone or in conjunction with the carbureter burner 92 during this stage of the blast cycle.

The heat recovered in the regenerator 100 from these blast gases is used for preheating air and superheating steam subsequently used in the process. The steam enters the regenerator through conduit 104, thence flowing tangentially into and downwardly through the generator with the oil spray or oil-steam spray introduced through nozzle 74.

The preheated blast air in either the up-blast or down-blast stage may be tempered and the oxygen content augmented by cold or preheated air introduced to the generator through conduits 42 and 48 from the air header 37. Cold or preheated secondary air may be introduced to the carbureter and regenerator either through the distributing header 132 and the respective valve-controlled lines 134, 136,—or air preheated in the process may be used,—the upper valve in line 132 then being closed.

The previously described forward gas-making run may be in part replaced or may be followed by a down-gas making run in the nature of a back-run. During the back-run the valve 19 in the rich gas offtake line is closed, and steam is introduced into the superheater through conduit 60. No carburant is introduced into the carbureter during this stage of operation. The mixed steam and combustible gases are directed either upwardly or downwardly through the generator screen, as desired, and the resultant combustible gases flow to the wash box either from the base of the generator or through branch conduit 86, by-passing the carbureter and superheater.

The oil or mixed oil-gas-water-gas produced by the invention has a controlled heating value resulting from combination of water gas, low B. t. u. gas, enriching gas and blow-run gas, within the range of from around 400 to 1200 B. t. u. per cubic foot, and a specific gravity of from around .28 to .70 or higher, depending upon the specific operating conditions selected. A wide range of mixtures of oil with gaseous hydrocarbon such as refinery cracking still gases may effectively be utilized. In one specific operation, .3 to .6 pounds of steam was employed during the down-run per pound of oil introduced into the generator, the amount of steam varying with the desired gravity of the final gas and the quality of oil employed—additional oil being employed for enriching the mixed gases within the carbureter for producing a 1000 B. t. u. gas. The upsteam run required from .45 to .6 pounds of steam per pound of generator oil employed. Approximately 50% of the total primary blast air was utilized in the up-blast stage of the heating cycle, although the ratio of air flowing through the refractory screen in the respective stages may be substantially varied. Usually a somewhat larger amount of air is used in the upblast stage than is used in the down-blast stage. Ratios as high as 3:2 have been employed successfully in this operation. The total amount of air used in the blast cycle preferably is in the range of from 32 to 45 cu. ft. per pound of oil fed to the generator.

In instances where the down-blast stage is followed by a down-steam purge in which the purged gases flow to the carbureter and superheater, the carbureter heating burner is shut off during the purge step.

The term "refractory screen" used in the specification and claims is intended to designate a filtering screen of heat-resistant refractory bodies of such size and shape,—and the screen being of such depth,—that sufficient carbon formed by hydrocarbon decomposition is retained thereby during a gas-making cycle to yield upon subsequent combustion substantially enough heat to supply the full heat requirements for cracking the hydrocarbon oil in a subsequent gas-making cycle, and for at least approximately providing the total heat requirements for the subsequent enrichment of the resultant gases.

The auxiliary oil burner in the carbureter top supplies any heat deficiency in the latter due to difficulties in distribution of the sensible and potential heat of the carbon-carrying blast gases leaving the generator screen. By igniting the carbureter oil burner prior to beginning the primary up-blast stage, the burner functions in the nature of a pilot light to insure ignition of the blast gases in the carbureter top. The utilization of the carbureter heating-burner and the combustion of a very small amount of oil therein, makes possible the adjustment of velocity rates of gas flow through the generator screen between wide limits. It may be stated generally that high gas velocities, above 150 cubic feet of air per square foot of cross-section of the refractory screen, are not so beneficially effected by the burning of small amounts of oil in the carbureter, as are units designed for operation where the gas velocity through the refractory screen is below that mentioned.

In instances where blower equipment associated with standard water gas plants give available pressure head of 40" of water or less, the velocity of the blast gases flowing through the generator screen usually is below that necessary to bring over any substantial amount of suspended carbon from the generator and for proper mixing with secondary air for heating the carbureter top. In such instances, the combustion during one or both stages of the air blasting cycle of from .1 to .8 gallon of gas oil or fuel oil, for each thousand cubic feet of combustible gas varying in heating value from 500 to 1200 B. t. u. per cu. ft. and in gravity from .40 to 80, produced in the operation, will render such gas-making set fully as efficient for carrying out the aforesaid process as where new equipment is employed which has been designed for providing the necessary gas velocities and intimacy of mixing of blast gases with secondary air to effect proper distribution of heat within the top of the carbureter and adapt the latter properly to function for enrichment purposes during the succeeding gas-making cycle.

It will be obvious to those skilled in the art that the present invention is not confined in its application to gas-making units in which the generator is in a separate housing from the carbureting and superheating units. On the contrary, it is clearly within the purview of the invention to utilize the same in connection with gas-making sets in which the generator and the carbureting and superheating unit or units are superposed and carried upon a single base. This type of construction is well known, and is generally arranged with the generator lowermost.

The invention is susceptible of modification within the scope of the appended claims.

I claim:

1. In a cyclic process for making combustible gas wherein during a gas make period hydrocarbons are cracked by passing the same through a relatively deep carbon filtering screen of highly heated uniformly sized small ceramic pieces with resultant production of hydrocarbon gas and deposition of carbon on the surfaces of the ceramic which carbon is burned during a subsequent air blast period, the step of blasting air successively upwardly and downwardly through the ceramic screen during the air blast period in amounts controlled to burn the carbon and heat the ceramic to high gas-making temperatures with the production of blast gases, burning the hot blast gases after admixture of secondary air therewith, insuring ignition of the air-blast gas mixture and supplementing the heat developed thereby by controlled combustion of a readily combustible fluid fuel supplied from an independent source to a point in the path of the mixture, storing the heat thus developed during the blast cycle, and utilizing the thus stored heat in vaporizing oil to carburet the gases produced during the make cycle.

2. In a process of the type defined in claim 1, the employment as a fluid fuel for igniting the secondary air-blast gas mixture and for supplementing the heat thereof, of from .1 to .8 gallons of readily combustible liquid hydrocarbon for each 1000 cu. ft. of combustible gas of desired heating value and gravity produced in the gas-making cycle.

ALFRED JOHNSON.

CERTIFICATE OF CORRECTION.

Patent No. 2,042,999.  June 2, 1936.

ALFRED JOHNSON.

It is hereby certified that error appears in the printed specification of the above numbered patent requiring correction as follows: Page 2, second column, line 49, for the words "which may include" read having associated therewith; page 4, second column, line 42, for "80" read .80; and that the said Letters Patent should be read with these corrections therein that the same may conform to the record of the case in the Patent Office.

Signed and sealed this 8th day of September, A. D. 1936.

Leslie Frazer (Seal)  Acting Commissioner of Patents.